United States Patent

Tarr

[11] 4,050,619
[45] Sept. 27, 1977

[54] METHOD OF ATTACHING A FRICTION LINING TO A REINFORCING CUP

[75] Inventor: Walter R. Tarr, Green Island, N.Y.

[73] Assignee: The Bendix Corporation, South Bend, Ind.

[21] Appl. No.: 683,116

[22] Filed: May 4, 1976

[51] Int. Cl.² .......................................... B23K 19/00
[52] U.S. Cl. .................................. 228/162; 228/24; 228/243
[58] Field of Search ................... 228/122, 124, 191 A, 228/162, 24, 243

[56] References Cited

U.S. PATENT DOCUMENTS

| | | | |
|---|---|---|---|
| 3,474,523 | 10/1969 | Musso et al. | 228/243 X |
| 3,639,974 | 2/1972 | Finnegan | 228/243 X |
| 3,900,149 | 8/1975 | Paton et al. | 228/122 |

*Primary Examiner*—Al Lawrence Smith
*Assistant Examiner*—James G. Smith

*Attorney, Agent, or Firm*—Leo H. McCormick, Jr.; Ken C. Decker

[57] ABSTRACT

A method of attaching a sintered friction material to a steel reinforcing cup. The sintered friction material is loosely placed in the steel reinforcing cup. An electrical induction heater surrounds the reinforcing cup and rapidly raises the temperature of the reinforcing cup to a predetermined temperature. When the predetermined temperature is reached, the reinforcing cup and sintered friction material are immediately moved to a press before the temperature of the bulk of the sintered friction material is significantly changed by thermal conduction of heat from the steel cup to the friction material. A single compressive force is applied to the sintered friction material and the steel reinforcing cup to compact the sintered friction material to a predetermined density and to form a metallurgical bond along the entire interface between the friction material and the reinforcing cup.

6 Claims, 2 Drawing Figures

METHOD OF ATTACHING A FRICTION LINING TO A REINFORCING CUP

BACKGROUND OF THE INVENTION

The invention relates to a method of bonding a sintered friction material to a steel reinforcing cup to produce a brake or clutch lining assembly.

In the past, friction material has been attached to steel reinforcing cup by either a mechanical or brazed bond. U.S. Pat. No. 2,784,105 discloses a typical mechanical bond. The mechanical bond is created by crimping the sides of the retainer cup around the friction material. Unfortunately, under some operational load conditions, a separation can occur between the friction material and the reinforcing cup.

In an effort to provide a better bond between the friction material and the reinforcing cup, a screen was welded to the reinforcing cup. A green preform of friction material was placed in the reinforcing cup. When the friction material is compacted to a desired density, the green preform flows around the screen to form a matrix. Then the friction material and the reinforcing cup are both heated in an oven where sintering hardens and strengthens the friction material. Unfortunately, often times after sintering, the reinforcing cup is distorted and the entire brake lining assembly must be discarded. In addition, the effective oven capacity is reduced because all the friction material, cup and screen must be heated to establish the mechanical bond.

In order to reduce the cost of a friction lining assembly, it was suggested that the screen could be eliminated if a metallurgical bond could be created between the friction material and the steel reinforcing cup. U.S. Pat. Nos. 3,528,807 and 3,761,256 disclose a method of producing such a metallurgical bond through the use of a brazing material. During the sintering of the friction material in the oven, the brazing material forms an alloy between the friction material and reinforcing cup. Unfortunately, the cost of the brazing materials and extra labor involved in this process has limited customer acceptance of this type of bonding.

Later, as disclosed in copending U.S. Pat. application Ser. No. 683,460, an economical method of bonding was devised for metallurgically bonding a sintered friction material to a reinforcing cup. In this method, the sintered friction material and the reinforcing cup are uniformly heated in an oven until a predetermined temperature is present throughout the entire assembly. When this predetermined temperature is reached, the assembly is moved to a press and a single blow applied to densify the friction material. Because of the temperature and force of the single blow a weld is created along the interface of the friction material and the reinforcing cup. Unfortunately, the microstructures of some friction materials are changed when the single blow is struck while the friction materials are at a high temperature, thereby rendering the end product unacceptable for all brake or clutch requirements. In addition, warping of the welded assembly is a problem when the assembly cools from the high temperature which still remains after the application of the press blow.

SUMMARY OF THE INVENTION

I have devised another method of reducing warping when a sintered friction material is attached to a retainer cup by a weld formed along the entire interface of the friction material and the reinforcing cup. In my method, a sintered friction material preform is placed in a retainer cup. The retainer cup and loosely positioned sintered friction material are placed in an inert or reducing atmosphere. The coils of an electrical induction heater are only positioned around the retainer cup holding the sintered friction material. Electrical current is supplied to the coils and the reinforcing cup rapidly heated to a selected high temperature, typically 1600° F., in less than 1 minute. By heating the reinforcing cup rapidly, only the sintered friction material adjacent the interface is significantly heated while the remaining sintered friction material remains substantially at room temperature. When the retainer cup reaches the selected high temperature, the friction material and reinforcing cup are immediately transferred to a press and struck and single blow while the bulk of the friction material is still cool and the retainer cup hot. The single blow compacts the friction material to a preselected density while establishing a weld along the entire heated interface between the friction material and the reinforcing cup. The brake pad assembly is then removed from the press and allowed to cool to room temperature. Thereafter, any excessive friction material is ground to a desired thickness and the brake assembly is ready for installation.

It is the object of this invention to provide a method of attaching a friction material to a reinforcing cup through a metallurgical bond created along the entire interface between the friction material and the reinforcing cup.

It is another object of this invention to provide a method of metallurgically bonding a sintered friction material to a reinforcing cup by rapidly heating the reinforcing cup and immediately applying a single blow to the sintered friction material to create a weld along the entire interface between the friction material and the reinforcing cup.

It is a further object of this invention to provide a method of manufacturing a brake assembly by metallurgically bonding a friction material to a reinforcing cup.

These and other objects will become apparent from reading this specification and viewing the drawings.

DETAILED DESCRIPTION

Figures 1, 2:
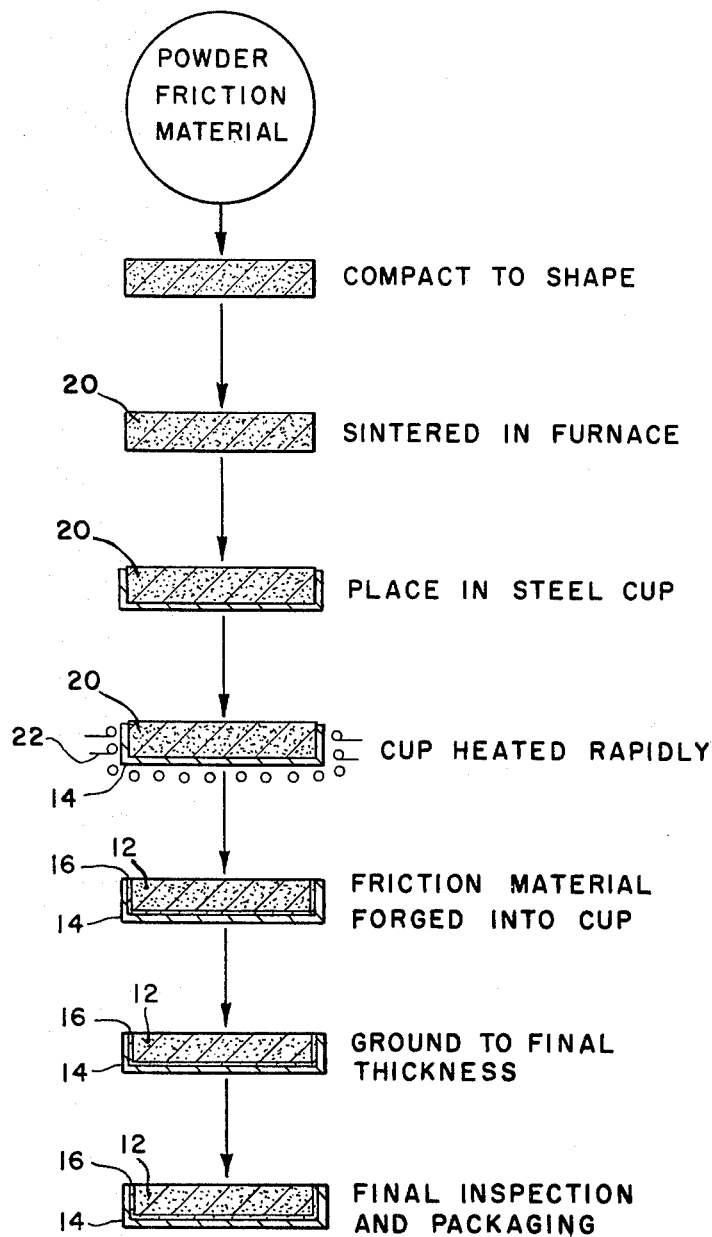
FIG. 1 is a sectional view of a brake pad assembly made according to the principles of my invention.
FIG. 2 is a flow chart illustrating the steps involved in making the brake assembly of FIG. 1.

The brake pad assembly 10 shown in FIG. 1 has a friction material 12 attached to a metallic reinforcing cup 14 through a metallurgical bond 16. The metallurgical bond or weld 16 extends along the entire interface between the friction material 12 and the metallic cup 14.

The friction material 12 for most applications is a copper base friction composition; however, for some applications, an iron base friction material may be desired and substituted by interchanging iron for the copper in the following Table 1.

TABLE 1

| Ingredient | Range by Weight | Example A |
|---|---|---|
| Copper or Iron | 25–90 | 70 |
| *Fuseable Material | 0–30 | 5 |
| Iron | 0–25 | 0 |
| Graphite | 5–40 | 18 |
| Nickel | 0–10 | 0 |
| **Friction Producers | 10–30 | 5 |

TABLE 1-continued

| Ingredient | Range by Weight | Example A |
|---|---|---|
| ***Friction Modifiers | 0-10 | 2 |
| | | 100% |

*Zinc, Bismuth, Lead, Tin and other materials with a relatively low melting point which alloy with other ingredients during sintering.
**Mullite, Kyanite, Silica, and other material with a high coefficient of friction.
***Molybdenum, Barium Sulfate, antimony, molybdenum disulfate, and other materials which prevent excessive wear, noise, and stabilize the coefficient of friction material.

The specific formula selected from Table 1 depends upon the specific application of the brake or clutch pad assembly. The Example A shown in Table 1 could be used for a clutch whereas if the brake pad assembly were to be used in an aircraft brake, a larger percentage of Friction Producers would be added while reducing the copper or iron content.

The composition of material of Example A in Table 1 adequately illustrates a type of copper base friction material 12 which can be attached to the reinforcing cup 14 by weld 16.

After a composition of material is selected, i.e. Example A, the ingredients in powder form are mixed together and placed in a preform die. A compressive force is applied to the powders to compact the ingredients into a preform shape shown as step 1 in FIG. 2. This preformed friction material is placed in a furnace having a reducing atmosphere to sinter the friction materials. The temperature of the friction material is raised. The sintering temperature reaches a range from 1350° to 1950° F. in about 30 minutes. At this temperature the ingredients are fused together. Thereafter the friction material is referred to as being a sintered friction material 20 shown as step 2 in FIG. 2. The sintered copper base friction material 20 is completely stable and can be stored over a period of time without any detrimental effect.

The reinforcing cup 14 is usually made of copper clad, carbon steel, typically AISI 1010 or 1050.

As shown in step 3 of FIG. 2, the sintered friction material 20 is loosely placed in the copper clad reinforcing cup 14 to form a brake pad assembly 10. A reducing atmosphere (exothermic gas) is circulated around the brake pad assembly 10 to prevent the formation of oxides along the interface of the friction material 12 and the reinforcing cup 14.

As shown in step 4, coils 22 of an electrical induction heater are placed around the outside of the reinforcing cup 14. Electrical current is supplied to the coils and the reinforcing cup 14 heated to about 1600° F. in less than one minute. In this period of time, the majority of the sintered friction material 20 remains at room temperature and only that portion of the friction material adjacent the interface shown by line 24 in FIG. 1 is heated by conduction since the friction material is only loosely retained in the reinforcing cup 14.

As shown in step 5, when the reinforcing cup 14 reaches the predetermined temperature, the brake assembly 10 is immediately transferred to a press where a single blow is struck to forge the material into the cup while the bulk of the friction material is still cool and the reinforcing cup is still hot. The single blow compresses the sintered friction material 20 to a desired density while creating a metallurgical bond along the entire interface 16. The brake pad assembly 10 is removed from the press and allowed to cool to room temperature. Thus, the operating surface 26 of the friction material 12 is maintained below a temperature which could alter the characteristics of the selected modifiers in a particular formula.

When the brake assembly 10 has cooled, the friction material 12 is ground to a preselected thickness, as shown by step 6.

Thereafter, the brake assembly 10 is inspected, and packaged for use as shown in step 7.

To determine the strength of the metallurgical bond, a shear test performed on samples of a brake assembly 10 indicated the sintered friction material 20 would fail before the weld 16.

I claim:

1. A method of attaching sintered friction material to a retainer comprising the steps of:
   placing the sintered friction material on a retainer to form an assembly;
   rapidly heating said retainer to a predetermined temperature;
   immediately transferring the assembly to a press before the temperature of said sintered friction material is significantly changed by thermal conduction; and
   rapidly applying a single blow to said assembly to compress said friction material with a predetermined density and to form a welded bond between the interface of the heated retainer and the friction material.

2. The method, as recited in claim 1, further including the step of:
   locating said assembly in reducing atmosphere before said retainer is heated to prevent the formation of oxides along the interface between the friction material and the retainer.

3. A method of manufacturing a brake pad assembly comprising the steps of:
   placing a powder mixture of friction composition in a die;
   compacting the powder mixture to form a preformed friction material;
   conveying said preformed material through a furnace having a predetermined temperature to sinter said powder mixture;
   removing said sintered preformed friction material from said furnace;
   placing said sintered preformed friction material in a reinforcing cup;
   rapidly heating said reinforcing cup to a predetermined temperature;
   transferring the heated cup and sintered friction material to a press before significant thermal conduction takes place between said heated cup and said sintered friction material and
   striking said sintered friction material and said heated cup with a single compressive blow to provide said friction material with a predetermined density and to establish a weld along the entire interface of said friction material and said retainer cup to produce said brake lining assembly.

4. The method, as recited in claim 3, further including the step of:
   surrounding said reinforcing cup with an electrical induction heater to rapidly heat said reinforcing cup.

5. The method, as recited in claim 4, further including the step of:
   locating said sintered friction material and said reinforcing cup in an inert atmosphere before said reinforcing cup is rapidly heated to prevent the formation of oxides along the interface of said sintered friction material and said reinforcing cup which could later effect the strength of said weld.

6. The method, as recited in claim 5, further including the step of:
 removing said brake assembly from said press and grinding said friction material to a desired thickness.

* * * * *